United States Patent [19]

Westbrook

[11] 4,045,620
[45] Aug. 30, 1977

[54] DIGITAL TONE DETECTOR
[75] Inventor: James E. Westbrook, Torrance, Calif.
[73] Assignee: Conrac Corporation, New York, N.Y.
[21] Appl. No.: 684,622
[22] Filed: May 10, 1976
[51] Int. Cl.$^2$ .............................................. H04M 1/50
[52] U.S. Cl. ............................................... 179/84 VF
[58] Field of Search ................ 179/84 VF; 324/78 D; 328/138, 139, 140

[56] References Cited
U.S. PATENT DOCUMENTS

| | | | |
|---|---|---|---|
| 3,537,001 | 10/1970 | Friend ............................... | 179/84 VF |
| 3,578,919 | 5/1971 | O'Neill ............................... | 179/84 VF |
| 3,760,269 | 9/1973 | Beeman ............................... | 324/78 D |
| 3,790,720 | 2/1974 | Schartmann ........................ | 179/84 VF |
| 3,917,912 | 11/1975 | Niwa ................................. | 179/84 VF |

Primary Examiner—Kathleen H. Claffy
Assistant Examiner—Joseph A. Popek

[57] ABSTRACT

Individual tones in a tone burst of limited duration are discriminated by repeatedly counting clock pulses during a definite selected number of tone cycles to produce a count summation. The selected number of cycles in each summation is so chosen that a clock frequency of relatively small value will produce a large enough count to insure clear discrimination between the input tones to be distinguished. At the same time, the invention provides a large enough number of distinct count summations to permit rigorous validation of each received tone. The available number of count summations is greatly increased by permitting successive summations to include several tone cycles in common. In particular, for decoding multi-frequency codes of the type generated by conventional touch dialing telephone equipment, the high and low frequency tone groups are typically detected separately by counting clock pulses of about 10 kHz during at least four successive cycles of the received tone, making such a count summation available throughout the tone burst every cycle after the first three. Each summation is tested for validity, as by comparing it with its predecessor and also with the expected count ranges for the tones of the group, producing condition signals which control the later decoding of the counts. The detection procedure combines high reliability with the possibility of using a clock frequency low enough to facilitate multiplexing of the equipment.

17 Claims, 5 Drawing Figures

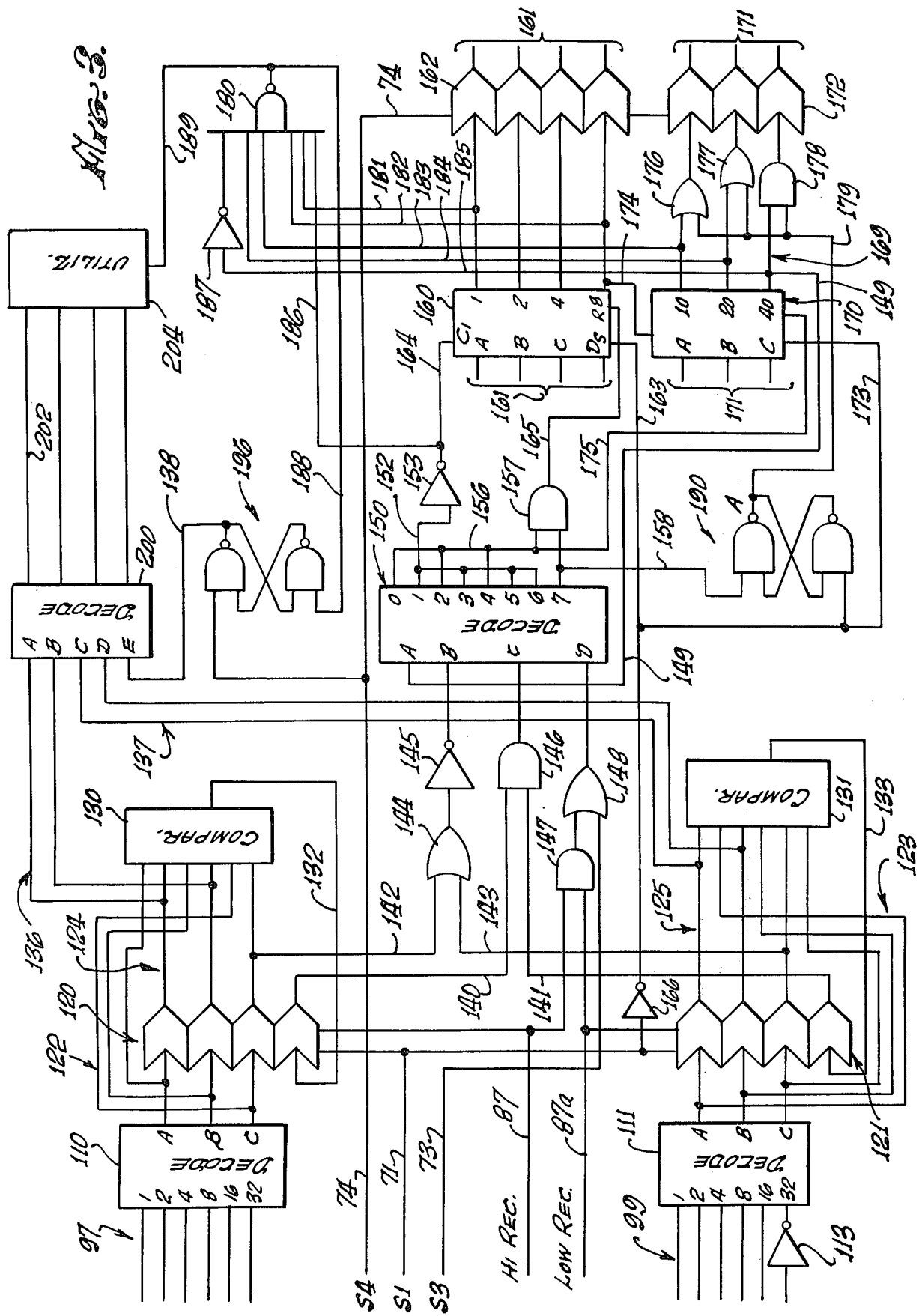

DIGITAL TONE DETECTOR

BACKGROUND OF THE INVENTION

This invention concerns improved means for selectively identifying input tone signals among a plurality of discrete frequency ranges. Such frequency detectors are especially useful for decoding numerical information that has been encoded in terms of multiple voice frequencies for transmission over telephone lines and the like.

For the sake of clarity, the invention will be described illustratively as it relates to the particular multi-frequency code that is typically generated by conventional touch dialing equipment. In that code, as more fully described in U.S. Pat. No. 3,537,001 to Joseph J. Friend, for example, each decimal digit is represented by a pair of simultaneous tones, one selected from an upper group of four harmonically unrelated audio frequencies and the other selected from a lower group of four similar frequencies. An important disadvantage in existing decoders for such touch dialing codes is the difficulty in applying normal multiplexing techniques to them. The same features that make the present invention especially effective for decoding touch dialing signals are also useful in a variety of other frequency detection operations.

As in many previously available systems for decoding such multi-tone codes, the present invention typically first separates the upper and lower tone groups by suitable filters, which may be either analog or digital in nature. The resulting upper and lower signal components are then supplied to distinct multi-tone discriminating circuits, which may be closely similar in design. Each tone discriminator produces an output signal, typically in digital form, representing the received frequency of its group. The two discriminator outputs may be further tested for validity, and are then combined and converted to a suitable code representation of the corresponding decimal digit.

Among the major design considerations in frequency detectors of the described type is the effective combination of a sufficiently rapid response to a valid tone burst and a high degree of discrimination against false digit indications. Since each tone may persist on the line for only about 40 milliseconds (ms), the tone detector has a limited number of tone cycles with which to perform that dual function.

An object of the present invention is to provide circuit means capable of producing especially sensitive and reliable frequency discrimination within a tone burst of limited duration.

Spurious tone identifications can be reduced by making successive determinations of the received frequency, and comparing those determinations for consistency before accepting a result as valid. The larger the number of such tentative determinations, the greater the potential reliability of the final result. But also, in previous systems, the more numerous the determinations, the more hastily each must be completed, and hence the smaller the number of tone cycles upon which it can be based. Thus an increase in reliability due to more determinations tends to be offset by a corresponding reduction in the potential reliability of each. No fully satisfactory solution of that dilemma has been proposed by the prior art.

A further object of the invention is to provide a multi-frequency detector capable of deriving from a limited number of tone cycles a relatively large number of distinct tentative frequency determinations without a corresponding reduction in the number of frequency cycles upon which each determination is based. The significance of a successful consistency test is thereby increased, leading to improved overall reliability of operation.

A further aspect of the invention concerns multiplexing of the frequency detector, whereby a single pair of upper and lower frequency discriminators, for example, can handle a large number of multifrequency dial signals from different telephone circuits. Such multiplexing involves a further dilemma of conflicting design objectives. The complexity and expense of multiplexing equipment tends to increase with the frequency at which each of the input lines must be addressed. On the other hand, reduction of that sampling frequency tends to reduce correspondingly the clock frequency by which the tone cycles are timed, complicating reliable distinction between closely adjacent signal tones.

The present invention resolves that conflict. As a result of its novel frequency discriminating technique, the invention can operate effectively at a relatively low clock frequency, permitting a satisfactory number of input circuits to be sampled at a convenient and economical rate.

SUMMARY OF THE INVENTION

The present invention provides a new counting technique by which the limited duration of a typical tone burst can be made to accommodate a satisfactory number of tentative frequency determinations, each based on a count of clock pulses during an adequate number of tone cycles. That is accomplished in large part by accepting successive determinations that are not strictly independent of each other. More particularly, individual counting periods are allowed to overlap, so that individual cycles of the input tone are typically included in more than one counting period. The invention can thus provide a relatively large number of counting periods each of which occupies a relatively large fraction of the entire tone burst, while retaining the basic concept that no two counting periods are identical. In principle, the invention permits wide freedom in selection of the number of distinct counting periods and the number of tone cycles included in each such period. With suitable selection of those factors the clock frequency can be reduced well below any previously proposed value, and without sacrificing other advantages of the present system.

In preferred form of the invention, clock pulses are first effectively counted during a selected number N of consecutive tone cycles, yielding a first count sum. That sum is then modified by (1) adding to it the clock pulses counted during a predetermined additional smaller number $n$ of tone cycles, and (2) omitting from the sum the clock pulses that had been counted during the initial $n$ tone cycles. Thus a new N-cycle count sum is created, having an overlap of N−$n$ cycles with the first sum. That second count sum is again similarly revised after completion of an additional $n$ tone cycles, and that process is typically continued as long as desired, or as long as the tone burst persists. Distinct count sums are thus successively accumulated at a steady rate of one additional sum for each $n$ tone cycles. If $n$ is taken as unity, for example, as is ordinarily preferred, the number of count sums obtained is typically only N−1 less than the total number of tone cycles in the tone burst.

Since all count sums are uniformly based on N tone cycles, all sums are theoretically equal. However, since each sum is based on a distinct N-cycle period, irregularities due to noise or voices on the line, for example, or interference between the two frequencies of the tone code, do not affect all sums in the same way. Therefore, a finding after suitable tests that all sums are consistent is strong evidence of a valid count.

With suitable selection of the number N of tone cycles included in each of the described count sums, it is ordinarily feasible to obtain satisfactory values for three inter-related quantities: a number of count sums sufficient to insure validity of the detected signals; a number of clock pulses in each count sum sufficient to distinguish clearly between adjacent tone frequencies; and a clock frequency appreciably lower than was feasible in the prior art, thereby facilitating multiplexing of the decoder.

In general, for a given clock frequency, N is selected large enough to provide at least about 15 counts in each count sum for the tone signal of highest frequency. Each tone used in the conventional touch dial multi-frequency code is normally permitted a frequency variation of ± 1.5 percent, or a total range of 3 percent, so that there is a clear interval of 7 percent between adjacent edges of the allowed ranges of adjacent tones. If the normal count for the highest frequency is at least about 15, that 7 percent clear separation represents at least one full count, providing a clear distinction between the two tones.

In an illustrative preferred embodiment of the invention, the clock frequency is set at 10 kHz, which provides a conveniently low repetition frequency for multiplexing 30 or 40 input circuits, for example. In that embodiment $N = 4$ and $n = 1$, in the above notation, so that each count sum includes four cycles of the input tone, with an overlap of three cycles between successive count sums. Since the highest tone frequency used in the conventional touch dial code has a nominal value of 1,633 Hz, or a period of 0.612 ms, N cycles of that tone include 0.612 NF clock pulses at a clock frequency of F kHz. Hence, to meet the criterion mentioned above of at least 15 counts per summation, the product NF should be at least about 25. With $N = 4$, as in the embodiment to be described, a clock frequency F as low as about 25/N or 6.25 kHz may be useful. At clock rates above about 80/N the count per sum tends to be inconveniently high, even if N exceeds 4. The preferred clock rate when $N = 4$ is sufficient to insure the count summations a comfortable margin above 15. For example, a clock rate of 40/N then yields count summations of about 24.5 for the highest tone. The invention preferably uses part of that margin to permit use of simplified counting circuitry whereby the last count of each tone cycle is omitted, reducing all the count sums by four.

The illustrative value $N = 4$ also provides a fully satisfactory number of count sums for verifying validity of the recieved tone. Each burst of the code, lasting at least about 40 ms, contains about 28 cycles of the tone of lowest frequency, which has a nominal value of 697 Hz, or a period of 1,435 microseconds ($\mu$s). Hence a minimum of about 24 distinct count sums are available for carrying out any desired test of validity of the received tone.

If fewer count summations are needed, N may be selected larger than 4. The increased number of tone cycles in each sum may then be used either to produce more clock counts in each sum or to reduce the clock rate. The invention thus provides several types of flexibility, permitting accommodation of a wide variety of conditions and special requirements. With $N = 12$, for example, there are still about 16 distinct count sums in a burst of the lowest frequency tone. The above described generous criterion of 24 counts per sum can then be satisfied with a clock frequency as low as 3 kHz, if that should be desired. On the other hand, the very moderate clock rate of 10 kHz with $N = 12$ provides 73 counts or more per sum. Such high counts require more hardware, but tend to improve reliability of tone identification.

By producing multiple-period count summations of the type described, the invention achieves a high degree of performance in the detection of touch dial signals. A tone detection system in accordance with the invention is capable of attaining a high level of frequency discrimination, while maintaining a fast speed of response. A primary objective has been to utilize the flexibility of design made available by the invention to perform those and other valuable functions with an absolute minimum of hardware. A vital factor in accomplishing that purpose is the remarkable ease and economy with which systems employing the invention can be multiplexed.

BRIEF DESCRIPTION OF THE DRAWING

A full understanding of the invention, and of its further objects and advantages, will be had from the following description of an illustrative preferred manner in which it may be carried out. The particulars of that description, and of the accompanying drawing which forms a part of it, are intended only as illustration, and not as a limitation upon the scope of the invention.

In the drawing:

FIG. 3 is a schematic diagram representing illustrative circuit means for testing the validity of count summations delivered by the circuits of FIG. 2. FIGS. 3A and 3B represent modifications.

DESCRIPTION OF THE PREFERRED EMBODIMENT

Figure 1:
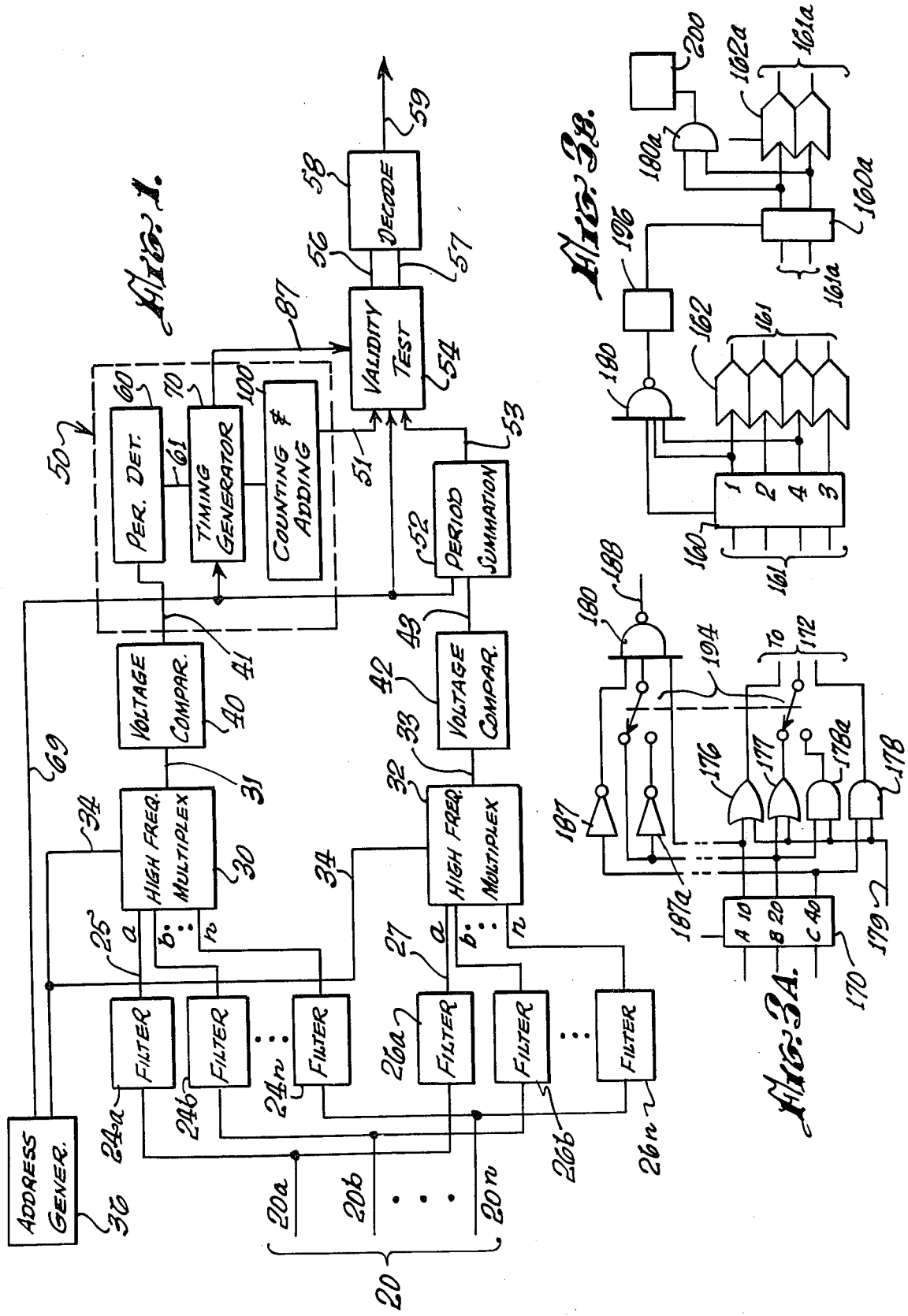
FIG. 1 is a schematic block diagram representing an illustrative multi-frequency tone detector embodying the invention.

In the illustrative tone detecting system of FIG. 1 the plurality of input lines 20a, 20b . . . 20n may carry touch dial signals received directly from respective telephone instruments, or the signals may, for example, be received in multiplexed form from a remote location. In the latter case, the input signals are typically demultiplexed in conventional manner and applied to the individual input lines indicated. The multi-tone signals on each of the input lines 20 are fed to an individual high frequency band pass filter 24, and are also fed to an individual low frequency band pass filter 26. The pass band of each filter is broad enough to transmit any one of the four frequencies of its group, while discriminating sharply against the frequencies of the other group. Thus, the filters decrease the variation in period of the tone in one group caused by interference from the tone in the other group. For illustration, the number of input lines will be assumed to be 40.

The 40 output lines 25a to 25n from the respective high frequency filters 24, each nominally carrying at any instant only a single tone of the high frequency group, are coupled to the respective inputs of the 40-channel multiplexer 30, which is typically of conventional design. The 40 corresponding low frequency lines 27a to 27n are similarly coupled to the respective inputs of the 40-channel multiplexer 32, which is typically a substantial duplicate of multiplexer 30. Both multiplexers are addressed at a common rate under control of address signals delivered via the address bus 34 from the address generation circuitry indicated at 36, which is typically of conventional design. The rate at which each channel is addressed will be assumed for illustration to be 10 kHz, or once every 100 $\mu$s. A new channel is then addressed once every 2.5 $\mu$s, or at a rate of 400 kHz.

The two output lines 31 and 33 from the respective high and low frequency multiplexers 30 and 32 thus carry the analog tone signals from all forty input lines 20a to 20n in time-sequential multiplexed form. Those analog tone signals are converted to digital form by the voltage comparators 40 and 42, each of which typically comprises a differential amplifier and suitable clipping circuits. The output digital signals on the lines 41 and 43 shift between the logic states 0 and 1 as the sampled analog signals vary in amplitude between the negative and positive half-cycles of their respective audio tones.

Those digital signals for the high and low frequency groups are fed to the respective period summation circuits 50 and 52, with which the present invention is especially concerned. As indicated explicitly for circuit 50, each period summation circuit includes a period detector 60 for detecting completion of each individual tone period on any one of the forty input lines, and for developing a period signal on the line 61. The period summation circuits also include the counting and adding circuits 100, which act in response to the period signals on line 61 under control of the timing generator 70 to compute for each input line the number of clock pulses during successive series of multiple tone periods. Those tone period series overlap in the sense that successive series include a definite number of tone periods in common. The resulting summations of clock pulses are typically represented by digital code signals on the output lines indicated schematically at 51 and 53 for high and low tones.

The high and low frequency period summations on the respective lines 51 and 53, typically still in multiplexed form, are preferably supplied to circuits for testing the validity of the summations. The tests applied may be of any desired type. Whereas some tests can be made separately on the high and low frequency tones, others involve comparisons of the summations obtained for those two groups. Accordingly, the validity testing circuits are represented in FIG. 1 as the single block 54, which receives the coded summations for both frequency groups.

The output signals from testing circuits 54 on the lines 56 and 57 may be of any desired form, but typically comprise coded representations of the particular audio tone in each group to which the validated period summations correspond. Those high and low tone signals are then decoded, typically in conventional manner by read only memory circuitry 58. The resulting signals on the lines 59 typically comprise a digital code representation of the decimal number that was dialed. That output is then utilized in any desired manner in the usual way.

Figure 2:
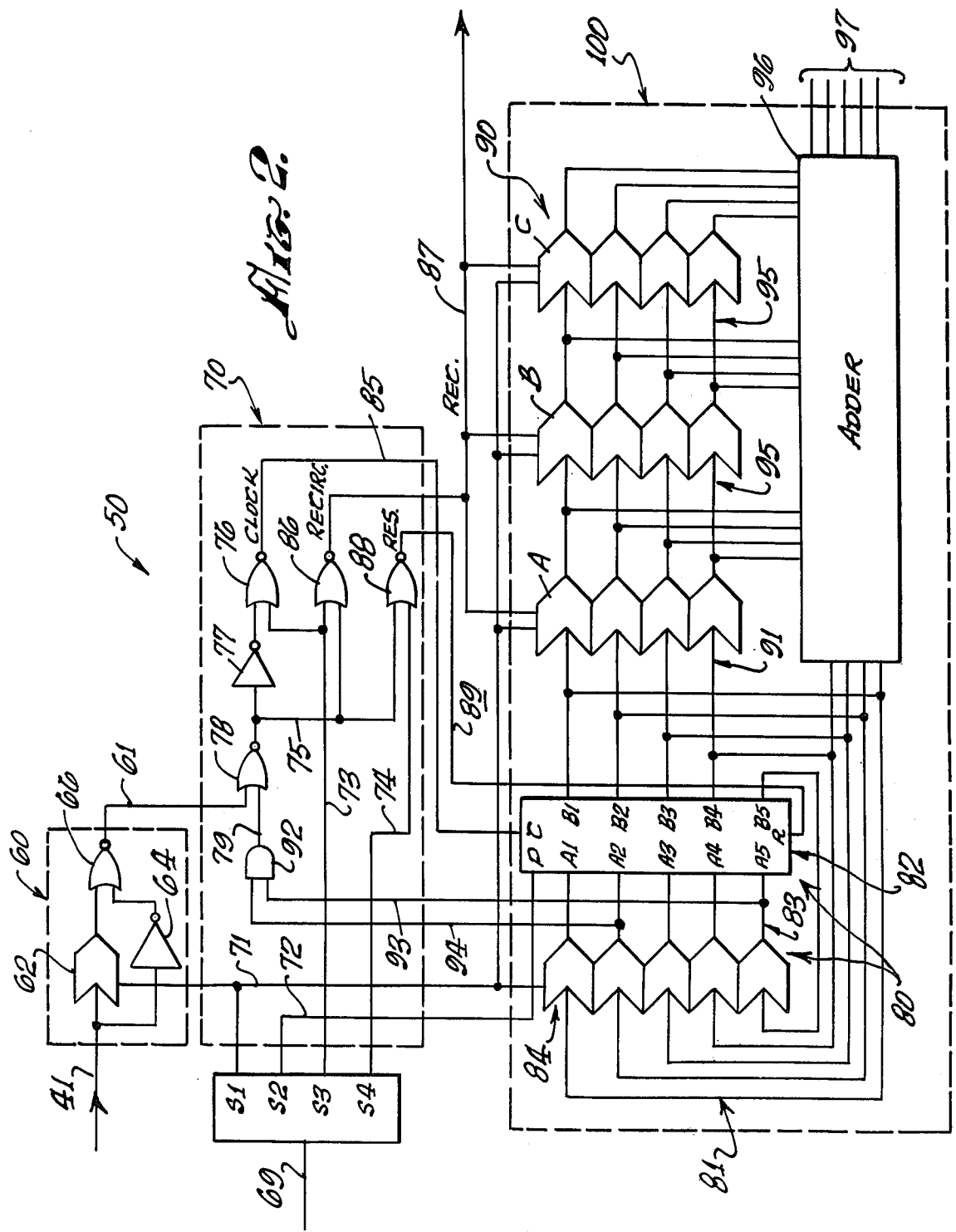
FIG. 2 is a schematic diagram representing an illustrative tone discriminating circuit arrangement in accordance with the invention.

FIG. 2 represents an illustrative embodiment of the period summation circuits 50 of FIG. 1, and may be considered also illustrative of circuits 52. For the sake of clarity of illustration, the present drawings and description are simplified in certain respects, omitting common features which might be included in an actual system. In particular, amplifiers, sources of bias potentials, latching, buffering and shaping circuits and the like may be provided wherever their functions are desired. Such features can readily be supplied by those skilled in the art.

Timing generator 70 is time controlled by the negative timing pulses S1, S2, S3 and S4, which occur in the order stated on the respective lines 71, 72, 73 and 74 during each sampling period of multiplexer 30. Those timing pulses are typically developed in known manner in address generator 36 of FIG. 1, and are delivered via the line 69 to the timing generators of both high and low frequency circuit sections, and also to validity circuit 54. The series of timing pulses is repeated at a frequency of 400 kHz, but since only one fortieth of the series occur during sampling of any one channel, their effective frequency for control of a particular channel is 10 kHz. The time relation is such that each pulse S1 substantially coincides with, or just follows, the change of address from one channel to the next.

Period detector 60 typically comprises the 40-position shift register 62, the inverting gate 64 and the Nor gate 66. As each new channel is addressed, the timing pulse S1 on line 71 clocks into shift register 62 the logic state that is produced for that channel on line 41 by voltage comparator 40. That action advances to the shift register output the logic state that was obtained 100 $\mu$s earlier during the previous sampling of the same channel. Gate 66 compares that previous logic state with the current state of the same channel, supplied in inverted form via gate 64. Gate 66 produces a logic 1 period signal on line 61 whenever both inputs are 0, that is, when the previous sample was at a logic 0 and the current sample is a logic 1 state. Such a condition indicates a low to high zero crossing, and hence the end of a tone period for that channel. On the other hand, at a high to low zero crossing both inputs to gate 66 are logic 1, while throughout the remainder of a tone cycle the two gate inputs are different. Under those conditions output line 61 retains its normal logic 0 state. The output from period detector 60 acts via the timing generator 70, to be more fully described, to control counting and adding circuits 100.

The latter circuits in the present embodiment comprise the period counter 80, which counts for each of the forty input channels the number of 10 kHz clock pulses during each tone period, the three-bank shift register memory 90, and the full adder 96 which receives inputs from counter 80 and each bank of the shift register memory.

Period counter 80 comprises the five-bit accumulating counter 82 and the shift register 84, interconnected by the lines 81 and 83. Counter 82 is typically of conventional construction, with input terminals A1 to A5 and output terminals B1 to B5 for the respective bits. The counter is loaded from the shift register output in response to a negative loading pulse at P. That count is incremented in response to a positive counting pulse at C. And the counter is reset to zero in response to a positive reset pulse at R.

As each new line is sampled, the count standing at counter output terminals B1 to B5 is clocked into shift register 84 by timing pulse S1, advancing to the shift register output the previously stored count for the newly sampled line. That previous count is then loaded into counter 82 by timing pulse S2. Under normal conditions, that is, in absence of a period signal on line 61, the count just loaded is incremented by a timing pulse S3, supplied via the line 85 from the Nor gate 76 which is normally held open by a logic 0 state from the inverter 77. In the present terminology a gate is considered open when the signal of interest will pass through it, closed when that signal is blocked. The incremented count is then returned to the input of shift register 84 at the next timing pulse S1. That counting procedure is normally repeated as each of the input lines is sampled. The shift register thus accumulates for each channel a count, which increases by one unit for each pass through the shift register.

Whenever, on sampling a line, a tone period has been completed since the previous sample, period detector 60 delivers a logic 1 signal to line 61. The Nor gate 78 normally receives a logic 0 signal via the line 79 from the And gate 92, the function of which is described below. The logic 1 period signal causes Nor gate 78 to shift the line 75 from its normal logic 1 state to logic 0. That change is inverted by the inverter 77, closing gate 76 and blocking the usual S3 counting pulse. Therefore the count that has just been loaded in counter 82 is not incremented.

The period signal on line 75 also opens each of the gates 86 and 88. Gate 88 delivers a timing pulse S3 to the line 87, releasing the recirculate of each of the three banks of the four-bit shift register memory 90. Those individual banks are advanced by timing pulse S1 at the 400 kHz rate in step with shift register 84. Release of the recirculate tranfers to memory bank A via the lines 91 the unincremented count at the four least significant output terminals of counter 82, and also transfers into the next following bank via the lines 95 any count that was standing in each of banks A and B. Following that action, a pulse S4 is delivered via the open gate 88 to reset terminal R of counter 82, resetting to zero the count for the addressed channel. That zero count is returned to the input of shift register 84 at the following S1 pulse.

Accordingly, on completion of the first cycle of an audio tone signal, the count of clock pulses accumulated by period counter 80 is stored in bank A of shift register memory 90. During the second tone cycle on the same input line, the counting operation is repeated. The resulting count is again stored in memory bank A, and the previously stored first cycle count is shifted into Bank B. That process is repeated during the third cycle, producing storage of three counts in memory. At the end of the fourth tone cycle, the three previous cycle counts are available in memory, and also, just prior to the release of the recirculate, the completed count for the fourth cycle is available at the output terminals of counter 82.

The full adder indicated schematically at 96 receives as four distinct inputs the four-bit counts standing at the outputs of the three banks of memory 90 and at the output of counter 82, and delivers on the six lines 97 a corresponding six-bit summation of those four input counts. Adder 96 is typically neither reset nor disabled at any time, and therefore registers continuously the sum of the four input counts. That summation is typically clocked into suitable latching circuitry incorporated in validity testing circuits 54 (FIG. 1) in response to the recirculate signal on line 87. Hence only the summation at completion of each tone cycle is available for further processing. That summation then represents the sum of the counts for the just completed tone cycle and the three preceding tone cycles.

Since the described circuitry does not count the final clock pulse of each tone cycle, the period count for each cycle is the number of 100 µs intervals minus 1. Hence, typical four cycle count summations are as follows for the standard audio tones of the high and low frequency groups, based on a possible error in tone frequency of ± 1.5 percent.

TABLE 1

| Frequency (Hz) | Period (µs) | Count Range |
|---|---|---|
| 697 | 1,435 | 52 – 55 |
| 770 | 1,299 | 47– 49 |
| 852 | 1,174 | 42– 44 |
| 941 | 1,063 | 37– 40 |
| 1209 | 827 | 28– 30 |
| 1336 | 749 | 25– 27 |
| 1477 | 677 | 22– 24 |
| 1633 | 612 | 20– 21 |

It will be recognized that slightly more elaborate circuitry would permit inclusion of the last clock pulse of each cycle. Each of the indicated count summation figures would then be increased by four.

With the circuit of FIG. 2 as so far described, it is possible that an apparently valid count may be produced by a spurious signal of frequency much lower than the tone group to which the circuit applies. That is, period detector 60 may detect a period termination after the count has exceeded 15 and has therefore overflowed the first four bits of counter 82. Those bits may then by chance represent a number that might be a valid count. To avoid that possibility, a synthetic period signal is developed by suitable circuitry in response to occurrence of a selected abnormally high count. As illustratively shown, the Nor gate 78 is inserted in the output line from period detector 60. The second input to the gate is held normally 0 by the And gate 92, since its input on the line 93 from the fifth bit of counter 82 is normally 0. Whenever counter 82 reaches the selected high count, shown typically as 18, both the input lines 93 and 94 to And gate 92 are logic 1. The resulting logic 1 input to Nor gate 78 produces the same actions already described for a normal logic 1 period signal on line 61. The synthetic count thus stored in memory 90, however, is only 2. Since that is far smaller than any possible valid count, any count summations that include it can be reliably rejected by subsequent validation circuitry.

It will be understood that FIG. 2 and the preceding description, can be modified in many respects without departing from the proper scope of the invention. As a typical example, a counter generally similar to counter 82 can be provided for each of the banks of shift register memory 90, with connections similar to 81 of FIG. 2 from each counter output to the associated shift register input and also to adder 96. The counting pulses on line 85 are supplied selectively to the four counters via suitable four-position switching means shiftable in response to the described recirculate release signal on line 87. Counting pulses are fed to one counter throughout a first tone period, and are shifted to the next counter for the next tone period. In that way the four counters continuously provide to adder 96 counts for the most recently completed four tone cycles for each channel.

A further illustrative modification of FIG. 2 eliminates any specific adding circuit such as 96. For example, N independent accumulating counters are provided, each with its shift register, as just described for the special case of $N = 4$. However, counting pulses on line 85 are normally supplied in parallel to all N counters, and each counter includes at least enough bits to accommodate the maximum anticipated count for N tone cycles. Signals to output lines corresponding to lines 97 of FIG. 2 are then obtained by sampling the N counter outputs in order in response to the successive period signals from period detector 60. After sampling, each counter is reset. Thus an output count summation is obtained at each period signal, each summation representing the count for the preceding N periods.

It will be noted that in the system of FIG. 2, as in the illustrative modifications just described, circuitry can be provided if desired to inhibit any output on lines 97 at the start of each new tone burst until the count has continued for at least four tone periods, or N periods in the general case. Although count summations produced sooner than that are not valid, they do not need to be eliminated at the present stage of the system. That is because later processing to be described will prevent such invalid summations from producing an incorrect final output.

The described system can readily be modified to alter the number N of tone cycles included in each count summation produced by adder 96 or its equivalent. For example, shift register memory 90 may include any desired number of banks such as A, B and C, with corresponding input connections to the adder.

To obtain a desired value of the number n of new tone cycles included in each successive count summation, line 61 is typically modified by insertion of circuitry of known design for keeping track of the period signals for each channel as it is addressed, and for passing to timing generator 70 only one nth of the period signals from period detector 60. The recirculate release signal is then produced only every n tone cycles. Clock pulses are therefore counted by period counter 80 for n complete tone periods before a recirculate signal causes the accumulated count to be transferred to shift register memory 90. That modification increases both n and N by the same factor, and a correspondingly increased number of bits must then be provided in all the appropriate units.

FIG. 3 represents somewhat schematically illustrative circuitry which may be employed at 54 and 58 of FIG. 1 for testing the validity of a series of count summations for both the high and low tone frequency groups and for decoding those summations to obtain a representation of the dialed number to which they correspond. The high frequency count summation from full adder 96 of FIG. 2 is continuously supplied as a six-bit binary coded number via lines 97 to the read only memory circuit 110 of FIG. 3. Circuit 110 is typically a conventional decoding circuit designed to convert the received count summation to the corresponding tone frequency in accordance with the lower half of Table 1. Output lines A and B from decoder 110 comprise a two-bit binary code representation of the tone frequency of the high group. Output line C is responsive to the 6th bit of the input and also to the decoding circuit. It is true only if the input summation represents a number that is less than 32 and also lies within one of the count ranges specified in Table 1. The output is then logic 0, indicating that the summation count is "valid." The three outputs A, B and C from decoder 110 are made available to the first three bits of the 40-position shift register 120, and also via the lines 122 to the comparison circuit 130, which is typically of conventional design.

Shift register 120 is advanced at the 400 kHz frequency by timing pulses S1 from line 71 as each new channel is addressed by multiplexer 30 of FIG. 1. That advances to the output of the shift register the previously stored data for the channel just being addressed. However, new data is entered in the shift register only in response to a recirculate signal on line 87. That signal is derived as already described in connection with FIG. 2, and denotes completion of a tone period of the high frequency group. Hence the data in shift register 120 for each channel continuously corresponds to the previously completed tone cycle for that channel.

Comparison circuit 130 receives that previous data via the lines 124, and compares each such individual input with the corresponding currently received input from lines 122. If all three pairs of input lines match, comparison circuit 130 produces a logic 1 state on the output line 132. That signal is processed through the fourth bit of shift register 120, appearing on the line 140 as a "high tone identical" signal, showing identity of the two previous high tone indications. Also, the output from the third bit of shift register 120 is tapped on the line 142 as a "high tone valid" signal, its logic 0 state showing that the previous period indication resulted from a valid count summation.

As has been stated, full adder 96 of FIG. 2 preferably operates continuously as the count for each tone cycle builds up in period counter 80. The resulting count summation, however, is significant only at the moment when a tone cycle is completed, as indicated by a period signal from period detector 60 and a resultant recirculate release signal on line 87. In the present embodiment, decoder 110 also operates continuously, processing both the significant and the spurious count summations received from adder 96. Shift register 120, by selecting the signals that coincide with a recirculate signal, eliminates the spurious data both from the binary tone signal at decoder outputs A and B and from the high tone valid signal at output C. Since comparison circuit 130 receives part of its information directly from decoder 110 via the lines 122, its output high tone identical signal on line 132 is processed through the fourth bit of shift register 120, which delivers only the significant signals to the line 140 and acts at a latch for all four output bits until the next recirculate release signal.

The validity testing circuits of FIG. 3 also receive count summation information for the low group of tones on the six lines 99, which corresponds to lines 97 for the high group of tones and to lines 53 of FIG. 1. That low tone information is processed by the decoder 111, the shift register 121 and the comparison circuit 131, which operate substantially as already described for the corresponding high group circuitry. However, the sixth bit of the binary code on lines 99 is typically inverted at 113, so that the decoder output at C is true for count summations which exceed 31. Also, the recirculate release signal supplied via the line 87a to shift register 121 is, of course, derived from period summation circuitry 52 for the low tone group (FIG. 1), and indicates completion of a cycle of the low tone. Hence only significant summation values are processed through shift register 121.

The first two bits from shift register 120, representing the tone frequency of the high group, and the first two bits from shift register 121, representing the tone frequency of the low group, are fed via the respective line pairs 136 and 137 to the decoder 200. That decoder is typically a read only memory circuit designed in conventional manner to convert those high and low tone signals to a binary representation of the decimal digit that was originally dialed. That output code for the number dialed is supplied via the line 202 to any desired apparatus 204 for utilizing the information. Decoder 200 is preferably normally disabled by a logic 1 signal at its terminal E, and is enabled only when that line is shifted to 0. Illustrative circuitry will now be described for producing that enabling signal in response to the validity and identity signals and the recirculate release signals.

The states of those condition signals are analyzed with relation to their past history by the decoder circuit 150 in accordance with its four input signals at A, B, C and D. Decoder 150 is typically a conventional circuit device for converting binary coded decimal signals to a straight decimal code with individual outputs for each decimal digit. Only the first eight output terminals 0 to 7 are utilized. Terminals 1, 3, 5 and 6 are connected together and to the line 152. Terminals 0, 2 and 4 are connected together and to the line 156. Terminal 7 is connected to line 158. The lines 152, 156 and 158 are normally at logic 1, but shift to logic 0 at a low true signal at any one of the connected terminals.

Input A to decoder 150, representing the least significant bit of the input code, is maintained by the line 149 at logic 0 except under conditions to be described. Input B is logic 1 only if the described high tone valid and "low tone valid" signals on lines 142 and 143 are both logic 0, indicating validity. The Or gate 144 then has a logic 0 output which is inverted at 145. Input C is logic 1 only when the high tone identical and "low tone identical" signals on lines 140 and 141 both indicate validity, presenting logic 1 signals to the And gate 146. The combination of logic 1 at both B and C may be considered to represent the "true" state of an overall condition signal, indicating overall validity of both count summations.

Input D, the most significant input bit, is normally logic 1. That effectively disables the decoder since the output decimal number is then 8 or 9 and neither of those outputs is used. Input D shifts to logic 0 in response to coincidence of a negative S3 timing pulse and a logic 0 recirculate release signal on at least one of lines 87 and 87a, indicating completion of a tone cycle. The And gate 147, acting as a negative logic Or gate, then supplies a logic 0 to Or gate 148, which also receives the negative S3. Thus, when signal S3 finds a tone cycle of either tone group just completed and both validity tests indicate a valid count summation for that cycle and the preceding one, the pattern of input signals DCBA to decoder 150 is 0110. That binary code represents the decimal number 6.

The resulting logic 0 on output line 152 is inverted at 153 and clocks a count into the conventional accumulating binary coded decimal counter, which comprises the units counter 160 and the tens counter 170. The four output lines from counter 160 are connected via the lines 168 to the inputs of the four-bit 40-position shift register 162. The shift register output lines 161 return to the respective counter inputs. Each time a new channel is addressed, the counter is loaded from the shift register in response to a positive pulse from the line 163, derived by inversion at 166 of a negative timing pulse S1 from line 71. Counter 160 is then incremented by the described clock pulse on line 164, and the resulting count, increased by one unit, is again stored in shift register 162 upon a timing pulse S4 from line 74.

So long as the input channel under consideration continues to receive a normal tone signal comprising valid upper and lower tones, decoder 150 receives the input code 0110 and counter 160 is incremented one unit each time either of the tones completes a cycle. Every 10 counts a single count is entered via the line 174 in tens counter 170. Only the first three bits of counter 170 are utilized, the fourth bit terminals being omitted for clarity. The three outputs on the lines 169 from counter 170 are fed to the respective inputs of the three-bit 40-position shift register 172 via the Or gate 176, the Or gate 177 and the And gate 178, respectively. The other inputs to those gates are connected in parallel via the line 179 to the output of the conventional latching circuit 190, which remains at logic 0 during normal incrementing of counters 160 and 170. The first two bits of shift register 172 then receive input signals normally from counter 170, whereas the third bit receives only 0's. Accordingly, the two counters acting together count normally only to the number 39.

If the described input signals 0110 to decoder 150 are interrupted during the course of such counting by an invalid summation at the time of a recirculate release signal, the resulting input signal DCBA to decoder 150 is 0100, 0010, or 0000 according as the invalidity is due to a false identical signal from gate 146 or a false validity signal from inverter 145, or both. The corresponding decoder outputs are the numbers 4, 2 and 0, each of which causes a logic 0 signal on line 156. That signal resets counter 160 via the And gate 157, acting as negative logic Or gate, and the line 165. Counter 170 is also reset directly via the line 175. The accumulated count of valid summations is thus set back to 0. If valid summations are again received, they are again counted as previously described.

Since valid summations may pertain to tones of either the high group or the low group and are counted uniformly without distinction as to group, the recorded count proceeds in a somewhat irregular manner with respect to time. However, even the minimum tone duration of 40 ms typically allows the count to reach 39 after several returns to 0, especially since any invalid summations ordinarily occur early in the tone burst. The described resetting of the count has the effect of disregarding early cycles of the tone burst whenever those cycles involve any irregularity. However, the present system has the advantage that if the initial cycles are regular they are utilized with full effectiveness.

When counter 160 and 170 reach a selected count, which is 39 in the present illustrative circuit, each of the lines 181 to 185 applies to the six-input Nand gate 180 a logic 1 signal, leaving only the input line 186 at logic 0. More particularly, counter 160 is at a count of 9, making output bits 1 and 8 logic 1. Counter 170 is at a count of 30, making output bits 10 and 20 logic 1. The third output bit from counter 170 is at 0, but is inverted at 187 before application to gate 180.

If another valid summation then follows in normal course, decoder 150 again supplies a positive clock pulse via inverter 153 to counter 160. However, that positive pulse is tapped via the line 186 and delivered to Nand gate 180, making all six of its inputs 1. A negative pulse is therefore delivered by that gate via the line 188 to the conventional latch circuit 196, setting the latch and shifting its output line 138 from 1 to 0. That enables decoder 200, already described. The decoder output lines 202 then represent the decimal digit which corresponds to the two tones represented by the respective pairs of input lines 136 and 137. The output negative pulse from gate 180 is preferably also supplied via the line 189 to utilization apparatus 204, where it is used in conventional manner to clock in and store the information on lines 202.

The same pulse that finally opens gate 180 and thereby enables decoder 200 also increments counters 160 and 170 from 39 to 40. That closes gate 180, but the pulse it produced remains latched at 196 until the latch is reset by the S4 timing pulse on line 74 about one half microsecond later. With counter 170 at the count of 40, output line 149 from its third bit is at logic 1. That alters completely the action of decoder 150 by shifting its input A from 0 to 1.

The resulting action of decoder 150 depends upon whether valid high and low count summations continue to be received from the channel under discussion, or are interrupted. The former is more likely, since tone bursts usually last far beyond the minimum duration of 40 ms. If the tone burst continues after completion of its detection, validation and final decoding at 200, the next valid summation produces at decoder 150 an input signal 0111 which represents the decimal digit 7. The resulting logic 0 at output terminal 7 and on line 158 resets counter 160 to zero via the And gate 157 and line 165. Counter 170 is not reset, but its count is modified. The decoder signal on line 158 also sets the latch 190, which then applies a logic 1 signal via line 179 to each of the Or gates 176 and 177 and to And gate 178, opening the latter. The two Or gates supply the logic 1 signal for storage in the first two bits of shift register 172. The stored count is thereby altered from 40 to 70 in the shift register, and is so altered also in the counter 100 μS later. As long as only valid count summations continue to be received, the circuit remains in stable condition without change. The system is thus effectively disabled and cannot develop a second output signal from the same tone burst.

When the tone burst ends, or if the sequence of valid summations is interrupted for any other reason, the circuit of FIG. 3 remains in disabled condition for a set time period. That idle period is typically selected to approximate the minimum interdigit period for normal tone dialing. The system is then automatically returned to normal condition, ready to detect the next dialed number.

Even in absence of a code tone there is sufficient random sound on the line being sampled to develop numerous period signals in both the high and low tone period detectors (FIG. 2), with resulting production of recirculate release signals on lines 87 and 87a. And count sums are developed by the described circuitry, and supplied at each recirculate release signal to the validation circuits of FIG. 3. Virtually all of those summations will be found invalid, supply a logic 0 to one or both of the B and C inputs to decoder 150. With the system in the described idle condition, the total input pattern to the decoder is then either 0001, 0011, or 0101, depending upon the nature of the invalidity. Those inputs represent the decimal numbers 1, 3, and 5, respectively, and produce a logic 0 signal on output line 152, as was initially described for the input of 0110. As in that case, a clock signal is applied to counter 160. The invalid summations are therefore now counted just as the valid summations were counted when the A input to decoder 150 was 0. However, the counting now proceeds only to a selected number. That critical number in the present circuit is 9.

If one further invalid summation is received while the count is 9, counter 160 overflows and counter 170 is incremented by one count. The count of 70 is thereby changed to 80, shifting the fourth bit, if there is one, to logic 1, and causing all three of the output bits illustrated to shift from 1 to 0. A logic 0 signal is thereby transmitted from the third bit of counter 170 via line 149 to the A input of decoder 150. That decoder is thereby restored to its normal condition in which valid summations are again counted in the manner initially described.

It will be noted that a valid summation received when the count is less than 9 does not restore the circuit to normal condition in the manner just described. On the contrary, the effect then is to produce an input 0111 to decoder 150. The decimal output of 7 has the effect already described, namely to reset counter 160 and set latch 190. The running of the interdigit period is thereby simply begun over again. Hence the system remains disabled indefinitely if valid tone counts due to a continuing tone code alternate with interruptions by invalid counts so long as all the interruptions are shorter than the selected interdigital period. Only when the full critical count of consecutive invalid summations has been reached is the circuit returned to normal condition.

Many alternatives are clearly available for modifying the circuitry of FIG. 3 to alter the described criterion for validating an indicated tone identification. The number of valid summations counted by counters 160 and 170 before Nand gate 180 is opened can readily be changed by suitable selection of inputs to the gate. As an illustrative example, FIG. 3A shows in fragmentary and schematic form a circuit modification to permit manual shifting between the described criterion of 40 valid summations and the less exacting criterion of 20 valid summations. With the double pole switch 194 in upper position, as shown, the circuit acts as in FIG. 3. With switch 194 in lower position, the output from the second bit of counter 170 is supplied to shift register 172 via the And gate 178a instead of via Or gate 177; and is supplied to Nand gate 180 via the inverter 187a instead of directly. Hence the second counter bit assumes the role previously played by the third bit.

Under some conditions it is desirable to produce a tentative validation having a relatively lenient criterion, but to require two or more such tentative validations before making the identification final. For example, as represented in fragmentary schematic form in FIG. 3B, the inputs to gate 180 from counter 160 are so selected that the gate is opened in response to a relatively small number of valid summations, typically five. The resulting gate pulse, representing a tentative validation, is latched at 196 as already described. However, the latch output is then used to clock an auxiliary counter 160a, with associated shift register 162a. Decoder 200 is enabled via the And gate 180a in response to a selected count in the auxiliary counter, which is then reset by means not explicitly shown. With that arrangement, an invalid count summation received after auxiliary counter has already stored one or more tentative validations clears only counter 160, permitting the system to continue accumulating tentative validations until the required number is reached.

A further illustrative criterion for validating a series of count summations employs a counter of the known type which counts up and down in response to signals at respective input terminals. With suitably modified wiring at decoder 150 of FIG. 3, such a counter can be made to count up in response to individual summations having true condition signals of any desired type, and down in response to those for which the condition signals are not true. The counter output is then typically supplied in parallel to two digital comparators of conventional type which produce signals representing the relation of the existing count to respective selected high and low limit values. A Nand gate corresponding generally to gate 180 of FIG. 3 can then be connected to enable decoder 200 in response to logic 0 input signals. One signal is developed and latched when the count reaches the low limit, indicating that a sufficient series of predominantly invalid summations has been received to demonstrate a suitable interdigital period. The other signal is developed when the count reaches the high limit, indicating that a sufficient series of predominantly valid summations has been received to demonstrate presence of a valid tone. By resetting the latch in response to the gate output, a second indication of that tone cannot be made until the count again reaches the low limit.

It will be evident from the preceding examples of typical validation procedures that the tone detecting method of the invention not only distinguishes clearly and positively between the tones of each group within the limited duration of a minimum tone burst, but also provides a generous number of distinct count summations for thorough testing of the result. The further capability of multiplexing virtually the entire decoding equipment, typically in the manner that has been described, permits great economy in providing equipment for decoding signals on a large number of circuits.

I claim:

1. Apparatus for discriminating multi-tone telephone signals, comprising
period means for detecting individual cycles of a received tone,
timing means responsive to the period means for producing for every $n$ tone cycles a binary code representation of the time elapsed during N consecutive tone cycles, where N is larger than $n$,
and decoding means responsive jointly to a plurality of said code representations for identifying the frequency of the received tone.

2. Apparatus according to claim 1 wherein $n$ is one and N is at least four.

3. Apparatus according to claim 1 including
means responsive to each of said code representations for producing a validity signal which is true only when the represented elapsed time corresponds to one of said multi-tones,
and means for enabling said decoding means with respect to any code representation only in presence of a true validity signal.

4. Apparatus according to claim 1 including
means for producing, for each said code representation, an identity signal which is true only when the represented elapsed times for two successive code representations correspond to the same tone,
and means for enabling said decoding means only in response to a selected number of successive identity signals.

5. Apparatus for discriminating multi-tone touch dial telephone signals, comprising
means for detecting individual cycles of a received tone and for producing period signals in response thereto,
means for producing clock pulses at a clock frequency greater than the tone frequency,
means for counting clock pulses,
timing means responsive to period signals and to said counting means for producing count summations at intervals $n$ period signals apart, each count summation comprising a binary code representation of the number of clock pulses counted since the Nth previous period signal, N being larger than $n$,
and decoding means responsive jointly to a plurality of said code representations for identifying the frequency of said received tone.

6. Apparatus according to claim 5 wherein $n$ is one, N is at least four, and said clock frequency is between about 25/N and about 80/N kHz.

7. Apparatus according to claim 6 including
means for multiplexing said touch dial signals from a plurality of input lines,
said multiplexing means including means for addressing the signals derived from each input line at said clock frequency.

8. Apparatus according to claim 5 wherein $n$ is one and said timing means comprise
means for storing the number of clock pulses counted during each interval between successive period signals,
and means for summing the N most recent pulse counts.

9. Apparatus according to claim 8 including
means for detecting a selected count of clock pulses corresponding to a tone frequency lower than the lowest of said multi-tone signals,
and means responsive to said detecting means for generating a synthetic period signal and an associated synthetic pulse count which corresponds to a tone frequency higher than the highest of said multi-tone signals.

10. Apparatus according to claim 5 wherein $n$ is one, N is at least four, said pulse counting means comprise a plurality of individual pulse counters, and said timing means comprise means responsive to successive period signals for deriving count summations from the individual counters in sequence.

11. Apparatus according to claim 5 including
means responsive successively to each said code representation for producing true and false condition signals, respectively, according as the represented number of clock pulses represents and does not represent a valid tone frequency,
control means including counting means shiftable between a first state for counting successive true condition signals and a second state for counting successive false condition signals,
said control means normally disabling said decoding means and being responsive to a first selected count of true condition signals for enabling the decoding means and for shifting the counting means to said second state,
said control means including means responsive to a second selected count of false condition signals for returning the counting means to said first state.

12. Apparatus according to claim 11, said control means including means responsive to a false condition signal for resetting said counting means when in said first state.

13. Apparatus according to claim 11, said control means including means responsive to a true condition signal for resetting said counting means when in said second state.

14. Apparatus according to claim 13, said control means including also means responsive to a false condition signal for resetting said counting means when in said first state.

15. Apparatus for decoding multi-tone touch dial telephone signals which represent a dialed decimal digit in terms of a tone signal of an upper group and a tone signal of a lower group, comprising
   means for supplying the tone signals of the upper and lower groups to respective upper and lower circuit sections,
   means in each section for detecting tone cycles and for producing for every $n$ tone cycles a binary code representation of the time elapsed during N consecutive tone cycles, where N is larger than $n$,
   and decoding means jointly responsive to a plurality of said code representations from each section for producing signals identifying the dialed decimal digit.

16. Apparatus according to claim 15 including
   means in each circuit section responsive to successive code representations for producing a condition signal which is true only when a code representation corresponds to a tone of the group,
   means for counting true condition signals from both sections,
   and control means for normally disabling said decoding means, and for enabling the decoding means in response to the counting means reaching a selected count.

17. Apparatus according to claim 16,
   said control means including means for disabling said counting means in response to said selected count, and means for enabling said counting means in response to a selected number of successive false condition signals.

* * * * *